United States Patent Office 2,888,463
Patented May 26, 1959

2,888,463
PROCESS FOR PREPARING DIBENZANTHRONE VAT DYES

Werner Victor Cohen, Newark, Del., assignor to E. I. du Pont de Nemours and Company, Wilmington, Del., a corporation of Delaware No Drawing. Application July 1, 1957
Serial No. 668,889

5 Claims. (Cl. 260—340.3)

This invention relates to an improved process for preparing vat dyes from 16,17-dihydroxydibenzanthrone.

16,17-dihydroxydibenzanthrone in this discussion designates the compound formerly designated in patent literature as Bz-2,Bz-2'-dihydroxydibenzanthrone. In other words, it is the compound of formula

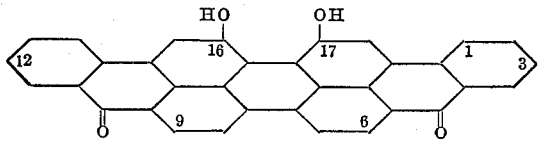

which, for simplicity, will be designated in this specification as

In British Patent No. 206,638 an oxidized dibenzanthrone which appears to be the 16,17-dihydroxy compound above formulated, has been reacted in sulfuric acid solution with aldehydes, polymerized aldehydes or acetals. While no formula for the product is given there, the process is believed to result in alkylation of the two OH atoms.

According to U.S. Patent No. 2,218,663, Bz-2,Bz-2'-dihydroxydibenzanthrone may be alkylated in alkaline medium by the aid of halogen alkanes or halogen alkenes to produce ketal type ethers of the formula

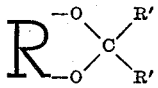

wherein R' and R" stand for lower aliphatic radicals such as CH₃, CH₂Cl and CH=CH₂, while

designates the bivalent radical of 16,17-dihydroxydibenzanthrone. The alkylation there is effected in an organic solvent suspension of an alkali-metal salt of the dihydroxydibenzanthrone and in the presence of an acid absorbing agent such as sodium acetate or potassium carbonate.

The products of said U.S. patent are superior to those obtained in the British patent with respect to brilliance of shade and fastness properties.

On the other hand, the process of U.S. Patent No. 2,218,663 leaves much to be desired, in that it requires the use of organic solvents and depends on the reaction of an active halogen in the alkylating agent. Altogether, this process is uneconomical and difficult to control.

Now I find that vat dyes of superior qualities and presumably of different structure than the compounds obtained in said U.S. patent may be obtained by reacting 16,17-dihydroxydibenzanthrone in sulfuric acid solution with certain ketonic agents, that is aliphatic or cycloaliphatic ketones, the corresponding diethyl, dimethyl or ethylene ketals, and certain epoxides or polymerized epoxides.

More particularly, the etherifying agent for the purpose of my invention may be selected from the following group of ketonic agents:

(a) Ketones per se, such as cyclohexanone, cyclopentanone, and the propanones and butanones of the formulas $$XCH_2-CO-CH_2Z$$

and $$XCH_2-CO-CHY-CH_3$$

wherein X and Y stand for hydrogen, chlorine or bromine, while Z stands for chlorine or bromine. It will be noted that all these are ketones which readily undergo enolization by virtue of the presence of an active CO—CH₂ grouping such as the atomic grouping

or

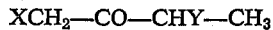

(b) Ketals corresponding to the aforegoing ketones, for instance diethyl ketal of 1-chloro-2-propanone:

1-bromo-2-propanone ethylene ketal:

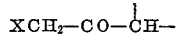

1,3-dichloro-2-propanone dimethyl ketal:

(c) Epoxides of the formula

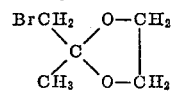

wherein X stands for hydrogen, chlorine or bromine; for instance, 2,3-epoxybutane, 1-chloro-2,3-epoxybutane, and 1-bromo-2,3-epoxybutane. It will be obvious that inasmuch as the reaction according to this invention is effected in concentrated sulfuric acid, commercially available polymers of said epoxides may be employed in lieu of the latter, inasmuch as such polymers cleave in sulfuric acid to give said monomeric 2,3-epoxybutane compounds.

Reaction is preferably carried out at moderate temperatures, say room temperature to 75° C. Lower than room temperature, say 10° C., may be used, but the reaction then is very slow. For most efficient and economical results, temperatures between 30° and 60° C. are recommended.

The sulfuric acid should be of a strength sufficient to dissolve the initial dihydroxydibenzanthrone. Acid of 85% to 100% strength is recommended, with a preferred range of about 96% to 100%. Mixtures of monohydrate with anhydrous phosphoric acid and with other mineral acids, such as hydrochloric and hydrobromic acids, containing no more than 15% of water in the mixture can also be used. The preferred amount of sulfuric acid is between about 10 and 20 parts per part of dibenzanthrone compound.

The theoretical quantity of etherifying agent is 1 mole per mole of dihydroxydibenzanthrone. But in practice, higher quantities are desirable, say 2 or even 5 moles of the agent per mole of the color. Still higher quantities are admissible, but not economical.

The time required for completing the reaction is dependent on the temperature, and may be anywhere from 2 to 72 hours. I find, however, that the time may be considerably shortened by effecting the reaction in two steps. In the first step, 16,17-dihydroxydibenzanthrone is dissolved in sulfuric acid as above indicated, the selected etherifying agent is added in desired quantity ranging from 2 to 4 moles of the agent per mole of the color, and the mass is agitated for say 2 to 4 hours. Then a quantity of a more reactive etherifying agent as indicated below is added, say from 2 to 3 moles per mole of the color, and agitation in the preferred range of temperature is continued for an additional period of say 1 to 4 hours. I find that in this fashion the reaction comes nearer to completion, and the product is redder (because of the absence of unconsumed dihydroxydibenzanthrone) than is otherwise obtainable in the same total heating period.

The etherifying agent selected for topping off the reaction in said second step may be entirely outside the range of ketonic agents above defined, and may be chosen for instance from the following group:

Aldehydes, particularly formaldehyde and its commercial polymers;
Acetals, for instance methylal, 1,3-dioxolane and acetaldehyde diethyl acetal;
Low molecular cyclic oxides of the 1,2-type, for instance ethylene oxide, epichlorhydrin, beta-methyl-epichlorhydrin, propylene oxide, n-butylene oxide, isobutylene oxide, and
Dioxane.

The products of this invention appear to be structurally related to those of Stallmann's U.S. Patent 2,218,663, but are apparently not identical therewith as is evident from certain characteristic reactions as well as from generally superior tinctorial and fastness qualities. Thus, whereas the products of Stallmann hydrolyze in acid (page 4, col. 1, lines 66–69 of the patent), my products are formed in highly concentrated sulfuric acid and are successfully isolated therefrom by dilution with water. Also, my products are generally characterized by outstanding brightness and by fastness to water-spotting and to ironing.

Without limiting this invention, the following examples are given to illustrate my preferred mode of operation. Parts mentioned are by weight.

*Example 1*

10 parts of 1-chloro-2-propanone were added slowly to an agitated solution of 10 parts of 16,17-dihydroxydibenzanthrone in 185 parts of 99.6% sulfuric acid at 33° to 35° C. and the alkylation mass was agitated at this temperature for 24 hours. A test sample, isolated by drowning a portion of the mass in water, was vatted and dyed on cotton. The bright blue dyeing was insensitive to pH changes in aqueous baths.

The dye was isolated by drowning the alkylation mass in 800 parts of ice-water, filtering, and washing the filter cake free of acid. The product thus obtained had excellent hot dyeing properties, and dyed cotton an attractive, bright navy blue shade from a royal blue colored vat. The dyeing thus obtained had excellent bleach fastness.

Similar results were obtained when the 10 parts of 1-chloro-2-propanone in the above examples were replaced by one of the following:

1,3-dichloro-2-propanone, 30 parts;
2-butanone, 24 parts;
Cyclopentanone, 14 parts;
Cyclohexanone, 28 parts;
1-chloro-2-propanone ethylene ketal, 16 parts;
2,3-epoxybutane, 8 parts;
3-chloro-2-butanone, 15 parts;
1,3-dichloro-2-butanone, 25 parts.

*Example 2*

7 parts of 1-chloro-2-propanone were added slowly to an agitated solution of 10 parts of 16,17-dihydroxydibenzanthrone in 180 parts of 99% sulfuric acid at 35° C. and the alkylation mass was agitated at this temperature for 4 hours. 3.4 parts of 1,2-propylene oxide were then added slowly and agitation was continued at 33° to 35° C. for 4 hours longer. A dyeing made from a test sample, as described in Example 1, was insensitive to pH changes in aqueous baths.

The dye was isolated as described in Example 1 and was similar in properties, when compared with the dye of that example, except for a noticeable increase in brightness and a redder shade of blue.

In similar manner, any of the other etherifying agents mentioned under Example 1 may be employed in the procedure of Example 2, and for topping off, in lieu of 1,2-propylene oxide, any of the non-ketonic topping agents listed hereinabove may be employed.

The following additional ketonic agents illustrate the wide choice of etherifying agents applicable in this invention in addition to those named under Example 1:

1-bromo-2-propanone;
1-chloro(or bromo)-2-butanone;
1-bromo-3-chloro-2-propanone;
1,3-dibromo-2-propanone;
1-bromo-3-chloro(or bromo)-2-butanone;
1-chloro-3-bromo-2-butanone, and 3-bromo-2-butanone;
The diethyl ketal of 1-chloro-2-propanone:

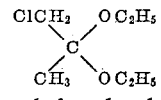

1-bromo-2-propanone ethylene ketal:

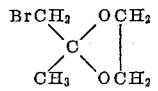

1-chloro(or bromo)-2-butanone ethylene ketal;
1,3-dichloro-2-propanone dimethyl ketal;
1,3-dichloro-2-propanone ethylene ketal;
1-bromo-3-chloro-2-propanone ethylene ketal;
1,3-dibromo-2-propanone diethyl ketal;
The diethyl ketal of cyclopentanone:

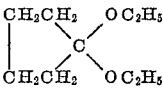

The dimethyl ketal of cyclohexanone:

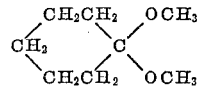

Other permissible variations in the steps of procedure or choice of reactants or solvent of this invention will be readily apparent to those skilled in the art.

I claim as my invention:

1. The process of producing a vat dye which comprises reacting upon 16,17-dihydroxydibenzanthrone in sulfuric acid solution with an etherifying agent selected from the group consisting of cyclohexanone, cyclopentanone, aliphatic ketones of the formulas

the dimethyl, diethyl and ethylene ketals corresponding to these ketones, and epoxides of the formula

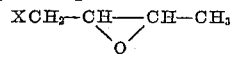

X and Y in the above formulas designating members of the group consisting of hydrogen, chlorine and bromine while Z is a member of the group consisting of chlorine and bromine, and recovering the reaction product.

2. A process as in claim 1, wherein the temperature of the reaction does not exceed 75° C., and wherein recovery is effected by diluting the reaction mass with water.

3. A process as in claim 1 wherein the reaction is continued until a test sample of the reaction product when isolated by dilution in water and applied to cotton fabric by vatting and oxidation gives a dyeing which is insensitive to acid and to alkali.

4. A process as in claim 1, wherein prior to completion of the reaction a second etherifying agent is introduced into the mass, said second agent being selected from the group consisting of low molecular aliphatic aldehydes and acetals, low molecular 1,2-epoxides and dioxane.

5. The process of producing a vat dye, which comprises adding to an agitated solution of 1 part of 16,17-dihydroxydibenzanthrone in from 10 to 20 parts of sulfuric acid of 85 to 100% strength and at room temperature to 75° C., an etherifying agent selected from the group consisting of cyclohexanone, cyclopentanone, aliphatic ketones of the formulas $XCH_2-CO-CH_2Z$ and $XCH_2-CO-CHY-CH_3$, the dimethyl, diethyl and ethylene ketals corresponding to these ketones, and epoxides of the formula $$XCH_2-CH-CH-CH_3$$
$$\diagdown O \diagup$$

X and Y in said formulas representing members of the group consisting of hydrogen, chlorine and bromine, and Z in said formulas being a member of the group consisting of chlorine and bromine, the total quantity of said etherifying agent fed in being from 2 to 5 moles for each mole of said dihydroxydibenzanthrone present in the solution, continuing the agitation of the mass for a further period of time between 2 to 72 hours, then drowning the reaction mass in water and recovering the precipitated vat dye.

References Cited in the file of this patent
UNITED STATES PATENTS

| | | |
|---|---|---|
| 1,531,261 | Davies et al. | Mar. 24, 1925 |
| 2,218,663 | Stallmann | Oct. 22, 1940 |

FOREIGN PATENTS

| | | |
|---|---|---|
| 206,638 | Great Britain | Nov. 15, 1923 |

UNITED STATES PATENT OFFICE

Certificate of Correction

Patent No. 2,888,463

May 26, 1959

Werner Victor Cohen

It is hereby certified that error appears in the printed specification of the above numbered patent requiring correction and that the said Letters Patent should read as corrected below.

Column 1, lines 45 to 48 inclusive, the formula should appear as shown below instead of as in the patent:

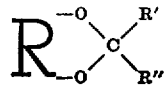

column 2, lines 38 to 41 inclusive, the formula should appear as shown below instead of as in the patent:

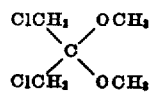

Signed and sealed this 27th day of October 1959.

[SEAL]

Attest:
KARL H. AXLINE,
*Attesting Officer.*

ROBERT C. WATSON,
*Commissioner of Patents.*